(12) United States Patent
Miao et al.

(10) Patent No.: US 9,099,156 B2
(45) Date of Patent: Aug. 4, 2015

(54) TWO-DIMENSIONAL MAGNETIC RECORDING SYSTEMS AND METHODS FOR MINIMIZING AND ACCOUNTING FOR INTER-MODULATION OF SIGNALS INDUCED IN ADJACENT READ ELEMENTS

(71) Applicant: Marvell World Trade LTD., St. Michael (BB)

(72) Inventors: Xiao Yu Miao, Singapore (SG); Sang Kong Chan, Singapore (SG); Ah Siah Chua, Singapore (SG); Thart Fah Voo, Singapore (SG)

(73) Assignee: Marvell World Trade Ltd., St. Michael (BB)

( * ) Notice: Subject to any disclaimer, the term of this patent is extended or adjusted under 35 U.S.C. 154(b) by 0 days.

(21) Appl. No.: 14/501,255

(22) Filed: Sep. 30, 2014

(65) Prior Publication Data

US 2015/0098147 A1     Apr. 9, 2015

Related U.S. Application Data

(60) Provisional application No. 61/888,283, filed on Oct. 8, 2013, provisional application No. 61/888,300, filed on Oct. 8, 2013, provisional application No. 61/889,152, filed on Oct. 10, 2013.

(51) Int. Cl.
*G11B 5/09* (2006.01)
*G11B 20/10* (2006.01)

(52) U.S. Cl.
CPC ............ *G11B 20/10314* (2013.01); *G11B 5/09* (2013.01)

(58) Field of Classification Search
CPC .... G11B 20/10009; G11B 5/09; G11B 5/012; G11B 5/02
USPC .......... 360/46, 67, 315, 61, 22, 32, 78.12, 70, 360/246; 370/342, 335
See application file for complete search history.

(56) References Cited

U.S. PATENT DOCUMENTS

| | | | | |
|---|---|---|---|---|
| 3,979,775 | A * | 9/1976 | Schwarz | 360/315 |
| 5,726,821 | A * | 3/1998 | Cloke et al. | 360/67 |
| 6,621,649 | B1 * | 9/2003 | Jiang et al. | 360/67 |
| 7,859,781 | B2 * | 12/2010 | Amemiya | 360/46 |

* cited by examiner

*Primary Examiner* — Nabil Hindi

(57) ABSTRACT

A system including transmission lines, read elements, and differential amplifiers. The read elements are connected in series. Each of the read elements is connected to a respective pair of the transmission lines. The differential amplifiers are connected respectively to the read elements via the transmission lines. The differential amplifiers are configured to amplify differential signals received from the respective pairs of the transmission lines.

18 Claims, 13 Drawing Sheets

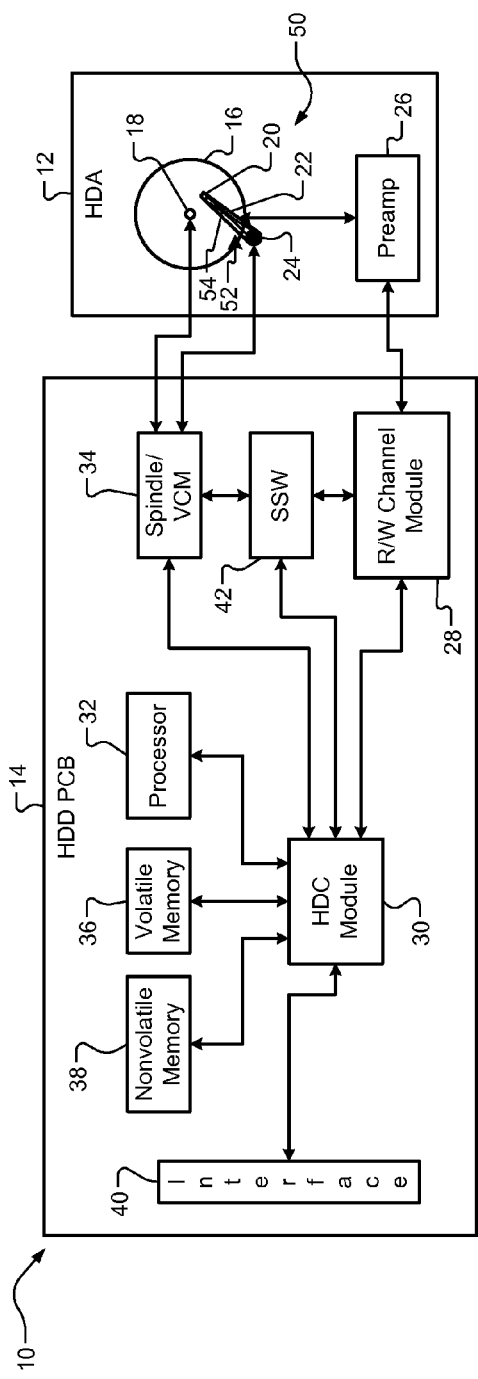
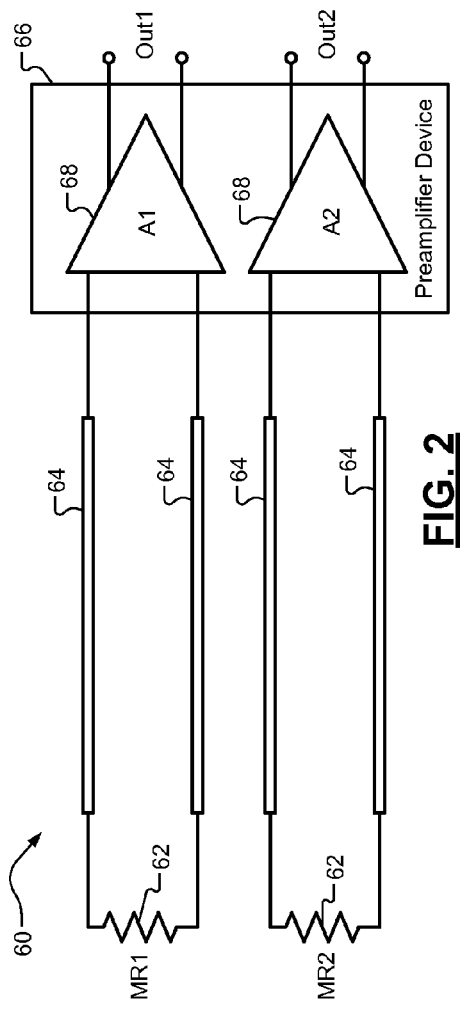
FIG. 1
Prior Art
FIG. 2
Prior Art

US 9,099,156 B2

TWO-DIMENSIONAL MAGNETIC RECORDING SYSTEMS AND METHODS FOR MINIMIZING AND ACCOUNTING FOR INTER-MODULATION OF SIGNALS INDUCED IN ADJACENT READ ELEMENTS

CROSS-REFERENCE TO RELATED APPLICATIONS

This application claims the benefit of U.S. Provisional Application No. 61/888,283, filed on Oct. 8, 2013, U.S. Provisional Application No. 61/888,300 filed on Oct. 8, 2013, and U.S. Provisional Application No. 61/889,152 filed on Oct. 10, 2013. The entire disclosures of the applications referenced above are incorporated herein by reference.

FIELD

The present disclosure relates to magnetic recording systems with trace suspension assemblies.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

FIG. 1 shows a hard disk drive (HDD) 10 that includes a hard disk assembly (HDA) 12 and a HDD printed circuit board (PCB) 14. The HDA 12 includes one or more platters 16, which have magnetic surfaces that are used to store data magnetically. Data is stored in binary form as a magnetic field of either positive or negative polarity. The platters 16 are arranged in a stack. The platters and/or the stack is rotated by one or more spindle motors (one spindle motor 18 is shown). One or more read/write heads (hereinafter, "heads") read data from and write data on the magnetic surfaces of the platters 16. A single head 20 is shown. Each of the heads includes a write element (e.g., an inductor) that generates a magnetic field and a read element (e.g., a magneto-resistive (MR) element), which senses the magnetic field on one of the platters 16. The heads are mounted at a distal end of one or more actuator arms (a single actuator arm 22 is shown). An actuator, such as a voice coil motor (VCM) 24, moves the actuator arm 22 relative to the platters 16.

The HDA 12 includes a preamplifier device 26. The preamplifier device 26 may include amplifiers for amplifying signals received from the heads. When reading data, generated magnetic fields induce low-level analog signals in the read elements of the head 20. The amplifiers amplify the low-level analog signals and output amplified analog signals to a read/write (R/W) channel (hereinafter, "read-channel") module 28.

The HDD PCB 14 includes the read-channel module 28, a hard disk controller (HDC) module 30, a processor 32, a spindle/VCM driver module 34, volatile memory 36, non-volatile memory 38, and an input/output (I/O) interface 40. During write operations, the read-channel module 28 may encode the data to increase reliability by using error-correcting codes (ECC) such as run length limited (RLL) code, Reed-Solomon code, etc. The read-channel module 28 then transmits the encoded data to the preamplifier device 26. During read operations, the read-channel module 28 receives analog signals from the preamplifier device 26. The read-channel module 28 converts the analog signals into digital signals, which are decoded to recover the data previously stored on the platters 16.

The HDC module 30 controls operation of the HDD 10. For example, the HDC module 30 generates commands that control the speeds of the one or more spindle motors and the movement of the one or more actuator arms. The spindle/VCM driver module 34 implements the commands and generates control signals that control the speeds of the one or more spindle motors and the positioning of the one or more actuator arms. Additionally, the HDC module 30 communicates with an external device (not shown), such as a host adapter within a host device, via the I/O interface 40. The HDC module 30 may receive data to be stored from the external device, and may transmit retrieved data to the external device.

The processor 32 processes data, including encoding, decoding, filtering, and/or formatting. Additionally, the processor 32 processes servo or positioning information to position the heads over the platters 16 during read/write operations. Servo, which is stored on the platters 16, ensures that data is written to and read from correct locations on the platters 16. In some implementations, a self-servo write (SSW) module 42 may write servo on the platters 16 using the heads 20 prior to storing data on the HDD 10.

To increase the amount of data storage on a platter, densities of tracks (amounts of data stored in predetermined surface areas) are increasing, widths of tracks are decreasing, and pitches of tracks (or distances between tracks) are decreasing. As a result, a width of a head can be wider than a width of a single track. Because of this relationship between the head and the track, the head can pick up inter-track noise. Inter-track noise can refer to magnetic field characteristics detected and associated with one or more tracks adjacent to the track being read.

The HDA 12 may include a two-dimensional magnetic recording (TDMR) system 50 having a trace suspension assembly (TSA) 52. The TSA 52 refers to the one or more actuator arms and transmission lines (e.g., transmission lines 54 are shown) extending between the preamplifier device 26 and the heads. The transmission lines (sometimes referred to as traces) are suspended over the platters 16 via the one or more actuator arms. A TDMR system, such as the TDMR system 50, uses multiple heads positioned adjacent each other to read a single track on a surface of a platter. Signals from the heads are processed to counteract, cancel and/or minimize noise (e.g., inter-track noise) detected during the reading of the track. This improves a signal-to-noise ratio for improved recovery of data stored on the track.

FIG. 2 shows a TDMR system 60 that may be used in the HDA 12 of FIG. 1. The TDMR system 60 includes read elements 62, transmission lines 64, and a preamplifier device 66. The preamplifier device 66 includes differential amplifiers 68. Each of the read elements 62 is connected to a respective one of the differential amplifiers 68 and a respective pair of the transmission lines 64. The read elements 62 are isolated from each other. Since the read elements 62 are isolated from each other, noise coupling between the read elements 62 and cross-couplings of signals detected by the read elements 62 is minimized. As a result, inter-head modulation of signals is insignificant. The differential amplifiers 68 provide differential output signals Out1, Out2. Gain of each of the differential amplifiers 68 may be adjusted to increase amplitudes of the output signals Out1, Out2 and/or to improve corresponding signal-to-noise ratios.

SUMMARY

A system is provided and includes transmission lines, read elements, and differential amplifiers. The read elements are connected in series. Each of the read elements is connected to a respective pair of the transmission lines. The differential amplifiers are connected respectively to the read elements via the transmission lines. The differential amplifiers are configured to amplify differential signals received from the respective pairs of the transmission lines.

In other features, the transmission lines include a first transmission line, a second transmission line, and a third transmission line. The read elements include a first element and a second element. The differential amplifiers include a first differential amplifier and a second differential amplifier. The first element is connected to the first transmission line. The second element is connected to the second transmission line and the third transmission line. The first transmission line is connected to a first input terminal of the first differential amplifier. The second transmission line is connected to a second input terminal of the first differential amplifier. The third transmission line is connected to a first input terminal of the second differential amplifier.

In other features, the system further includes a module configured to receive output signals on respective channels from the differential amplifiers and recover data based on output signals. The differential amplifiers are configured to amplify the differential signals to generate the output signals.

In other features, the system further includes a device, heads, and an assembly. The device includes the differential amplifiers. The heads are disposed on a same surface of a disk. Each of the heads includes a respective one of the read elements. The assembly includes the transmission lines. The assembly suspends the transmission lines over a portion of the disk between the device and the heads.

In other features, a method is provided and includes: performing a read operation via read elements, where the read elements are connected in series, and where each of the read elements is connected to a respective pair of transmission lines; providing outputs of the read elements to differential amplifiers via the transmission lines, where the differential amplifiers are connected respectively to the read elements via the transmission lines; and amplifying, via the differential amplifiers, differential signals received from the respective pairs of the transmission lines.

In other features, the method further includes: amplifying, via the differential amplifiers, the differential signals to generate output signals; receiving output signals on respective channels from the differential amplifiers; and recovering data based on output signals.

In other features, a device includes the differential amplifiers. The read elements are arranged in respective heads. The heads are disposed on a same surface of a disk. The transmission lines are suspended over a portion of the disk between the device and the heads.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

FIG. 1 is a functional block diagram of a hard disk drive according to the prior art.
FIG. 2 is a functional block diagram of a TDMR system according to the prior art.

In the drawings, reference numbers may be reused to identify similar and/or identical elements.

DESCRIPTION

Figure 3:
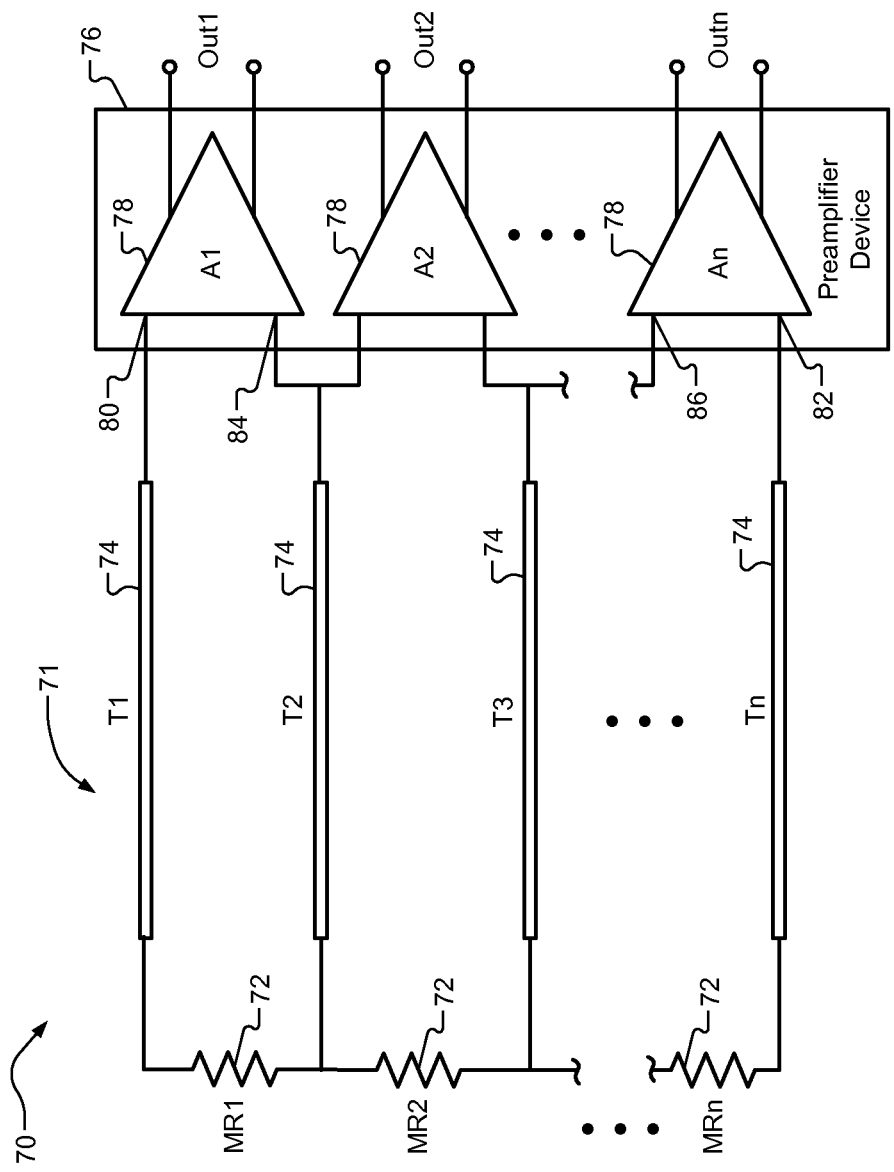
FIG. 3 is a functional block diagram of another TDMR system incorporating read elements connected in series.

To minimize space between read elements in a TDMA system, the read elements may be connected in series. FIG. 3 shows an example TDMA system 70 that may be used in the HDA 12 of FIG. 1. The TDMA system 70 includes: a read circuit 71 with read elements 72 and transmission lines 74; and a preamplifier device 76 with differential amplifiers 78. The preamplifier device 76 may replace the preamplifier device 26 of FIG. 1. The read elements 72 are connected in series and may be located in a head of a drive (e.g., in the head 20 of the hard drive 10 of FIG. 1). Each of the read elements 72 is connected to two of the transmission lines 74. Each of the read elements 72 share at least one of the transmission lines 74. Each of the differential amplifiers 78 is connected to two of the transmission lines 74. The number of read elements 72 is equal to the number of differential amplifiers 78. The number of transmission lines 74 is one more than the number of read elements 72.

Although space between the read elements 72 may be less than space between the read elements 62 of FIG. 2, since the read elements 72 are connected in series and share certain ones of the transmission lines 74, the TDMR system 70 exhibits noise coupling and cross-coupling of signals. The noise coupling and cross-coupling of signals is provided to the differential amplifiers 78 via the transmission lines 74. For example, at least portions of the signals induced in both of the read elements MR1 and MR2 are provided to the differential amplifier A2 via the transmission line T2.

In addition, impedances of the read circuit 71 seen at input terminals of each of the differential amplifiers A1, An are not the same. For example, outer terminals 80, 82 of the differential amplifiers A1 and An are connected respectively to transmission lines T1, Tn, which do not have ends connected between two of the read elements. Inner terminals 84, 86 of the differential amplifiers A1, An are connected to the transmission line T2 and the transmission line Tn−1, which do have ends connected between two of the read elements 72. Thus, the impedances of the read circuit 71 seen at the outer terminals 80, 82 are different than the impedances of the read circuit 71 seen at the inner terminals 84, 86.

As an example, impedances of each of the transmission lines 74 may be 50 Ohms($\Omega$). Each of the read elements 72 may have impedance Rmr. If Rmr>>50$\Omega$, then the impedance of the read circuit 71 seen at each of the outer terminals 80, 82 is essentially 50$\Omega$ (or impedance of a single transmission line), whereas the impedance of the read circuit 71 seen at each of the inner terminals 84, 86 is essentially 25$\Omega$ (or half the impedance of one of the transmission lines). Although one or more of the differential amplifiers 78 (e.g., differential amplifier A2) may have input terminals that see the same amount of impedance, since the impedances of the read circuit 71 seen at the input terminals 80-86 of the differential amplifiers A1, An are not the same, the differential amplifiers A1, An are unbalanced. A TDMA system with unbalanced differential amplifiers is not a fully differential system. Unbalanced differential amplifiers can decrease signal differentiation capabilities associated with the TDMA system.

Also, in order to minimize reflection of portions of signals provided by the read elements 72 via the transmission lines 74, impedance matching can be provided between (i) the transmission lines 74, and (ii) the input terminals of the differential amplifiers 78. For example, an input impedance of one of the input terminals of the differential amplifiers 78 may be set to match the impedance of the read circuit 71 seen at the one of the input terminals. This matching may be provided for each of the input terminals of the differential amplifiers 78. If input terminals of certain ones of the differential amplifiers 78 see different impedances of the read circuit 71, the complexity of the differential amplifiers 78 is increased. The increased complexity is associated with providing the impedance matching at each of the input terminals of the differential amplifiers 78 and compensating and/or accounting for the unbalanced differential amplifiers 78. The differential amplifiers 78 amplify differential signals received from the transmission lines 74 to generate differential output signals Out1-$n$.

Figure 4:
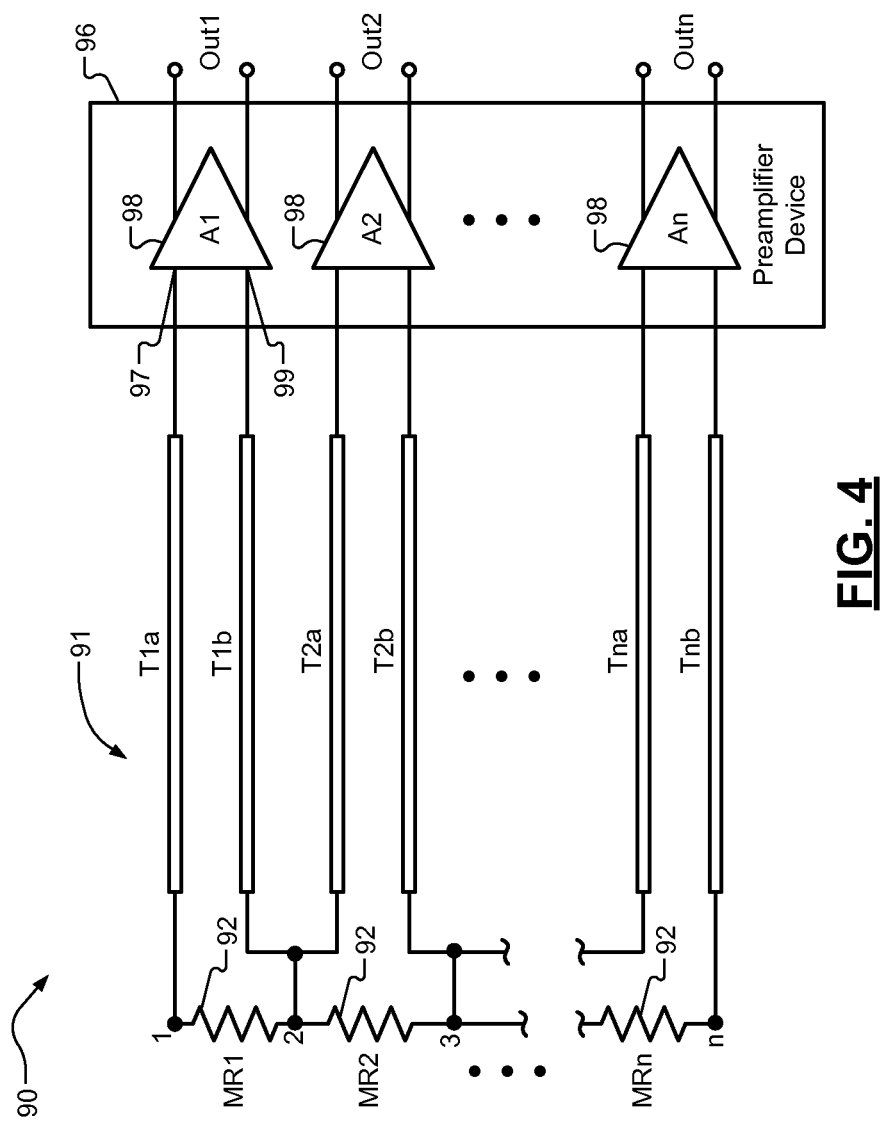
FIG. 4 is a functional block diagram of a TDMR system incorporating read elements connected in series with two transmission lines per read element in accordance with the present disclosure.

FIG. 4 shows a TDMR system 90 that may be incorporated in the HDA 12 of FIG. 1. The TDMR system 90 includes: a read circuit 91 with read elements 92 (may be referred to as sensors) and transmission lines 94; and a preamplifier device 96 with differential amplifiers 98. The preamplifier device 96 may replace the preamplifier device 26 of FIG. 1. The read elements 92 are connected in series and may be located in a head of a drive (e.g., in the head 20 of the hard drive 10 of FIG. 1). Ends of the read elements 92 are connected to nodes 1-$n$.

Although the TDMR system 90 may include any number of read elements, transmission lines, and differential amplifiers, the number of the read elements 92 is the same as the number of the differential amplifiers 98 and the number of transmission lines 94 is twice the number of the read elements 92. In other words, each of the read elements 92 is connected to a respective pair of transmission lines T1$a$ and T1$b$, T2$a$ and T2$b$, ..., Tna and Tnb. Each of the read elements MR1 and MRn is connected to three of the transmission lines 94. A first end of each of the read elements MR1, MRn is connected to a corresponding one of the transmission lines 94. A second end of each of the read elements MR1, MRn is connected to a corresponding two of the transmission lines 94. Each of the other read elements MR2 to MRn−1 is connected to four of the transmission lines. In other words, each end of the read elements MR2 to MRn−1 is connected to a respective pair of the transmission lines 94. Each of the differential amplifiers 98 is connected to a respective pair of the transmission lines 94. Because of these relationships between the read elements 92, the transmission lines 94, and the differential amplifiers 98 and because the transmission lines 94 have the same impedance, the differential amplifiers 98 may be balanced and the TDMR system 90 may be a fully differential system.

Although some of the ends of the read elements 92 are connected to multiple pairs of transmission lines, cross-coupling of signals is minimized due to high-impedances relative to ground seen at the ends of the read elements 92. Impedances seen at the nodes between read elements (e.g., the nodes 2 to n−1) may be referred to as common mode impedances. The common mode impedances relative to ground are high to prevent cross-coupling of signals. Common mode impedances exist at nodes between read elements, such as at nodes 2 and 3. For example, the high impedance at node 2 between read elements MR1 and MR2 minimizes an amount of a read signal, induced in read element MR1, from being received at the second transmission line T2. Cross-coupling of signals is also minimized due to high impedances of the read elements 92. For example, an amount of a read signal induced in the read element MR1 that passes to the read element MR2 is negligible. However, differential impedance of each of the pairs of the transmission lines 94 seen at each of the differential amplifiers 98 is small (e.g., 100$\Omega$).

The common mode impedances are greater than the differential impedances seen by the differential amplifiers 98. As an example, a common mode impedance may be 5-10 times greater than one or more of the differential impedances. As another example, a common mode impedance may be 10-100 times greater than one or more of the differential impedances. This allows the differential amplifiers 98 to receive and amplify the read signals induced in the respective read elements 92 and to minimize amounts of read signals received from adjacent read elements. Adjacent read elements refer to read elements that are directly connected to each other and/or are consecutive read elements in a series of read elements.

In addition, the impedances of the read circuit 91 seen at the input terminals of the differential amplifiers 98 may be the same. For example, the outer terminal 97 of differential amplifier A1 may see an impedance of 50$\Omega$ (impedance of transmission line T1$a$) and the inner terminal 99 of differential amplifier A1 may see an impedance of 50$\Omega$ (impedance of transmissions line T1$b$). This allows the input impedances of the input terminals of the differential amplifiers 98 to be the same, which simplifies circuit design of the differential amplifiers 98. In addition, the input impedances of the input terminals of the differential amplifiers 98 may match impedances of the read circuit 91 seen by the input terminals of the differential amplifiers 98. This minimizes signal reflections at the inputs terminals of the differential amplifiers 98. The differential amplifiers 98 amplify differential signals received from the transmission lines 94 to generate differential output signals Out1-$n$.

Figure 5:
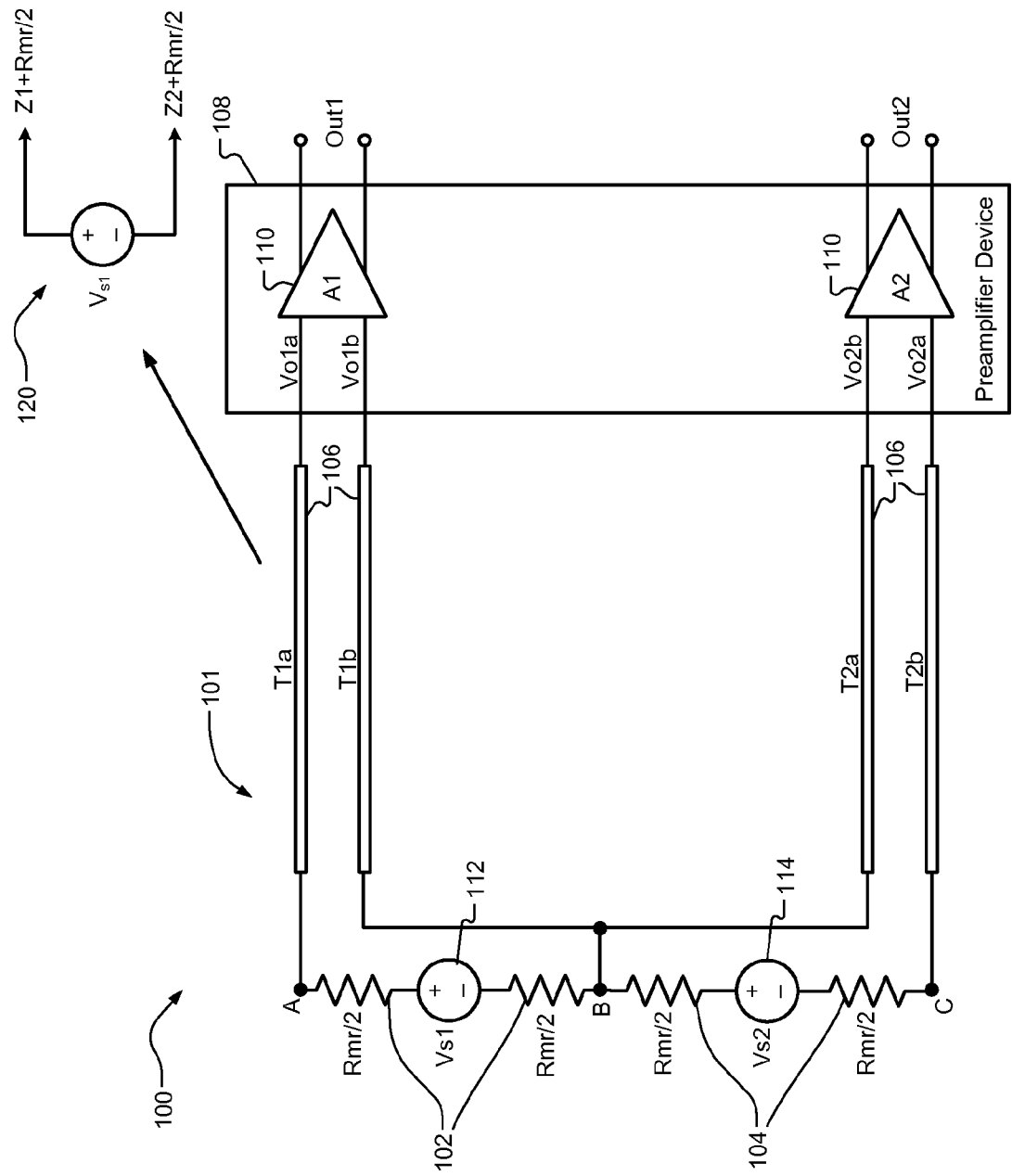
FIG. 5 is a functional block diagram of a TDMR system illustrating voltage generation of read signals and a corresponding equivalent impedance representation for a read element in accordance with the present disclosure.

FIG. 5 shows a TDMR system 100 that includes: a read circuit 101 with read elements 102, 104 and transmission lines 106; and a preamplifier device 108 with differential amplifiers 110. The preamplifier device 108 may replace the preamplifier device 26 of FIG. 1. The read elements 102, 104 are connected in series and may be located in a head of a drive (e.g., in the head 20 of the hard drive 10 of FIG. 1). Each of the read elements 102, 104 is shown by a pair of resistances having values Rmr/2. Although a certain number of read elements, transmission lines, and differential amplifiers are shown, the TDMA system 100 may have any number of these devices. Generation of read signals and corresponding read voltages at the read elements 102 is represented by voltage sources 112, 114, which provide respective read element voltages Vs1 and Vs2. Each of the voltage sources 112, 114 is shown as being connected between the resistances of the respective one of the read elements 102, 104. Each of the read elements 102, 104 may have a total resistance of Rmr. Each of the differential amplifiers 110 is connected to a respective pair of the transmission lines T1a and T1b or T2a and T2b.

Three nodes A, B and C are shown. Node A is connected between the first read element 102 and the first transmission line T1a. Node B is connected between the first read element 102 and the second read element 104 and is connected to the transmission lines T1b, T2a. Node C is connected between the second read element 104 and the fourth transmission line T2b.

The first differential amplifier A1 receives a first differential voltage Vo1 having corresponding potentials Vo1a and Vo1b at respective input terminals of the first differential amplifier A1. The second differential amplifier A2 receives a second differential voltage Vo1 having corresponding potentials Vo1a and Vo2b at respective input terminals of the second differential amplifier A2.

A corresponding equivalent impedance representation 120 for the first read element 102 is shown assuming impedances of the read circuit 101 seen at ends of the transmission lines 106 nearest the differential amplifiers 110 match respective input impedances of the input terminals of the differential amplifiers 110. As an example, the impedance of each of the transmission lines may be 50Ω. The equivalent impedance representation 120 includes the first voltage source 112 having the first read element voltage Vs1 and output current I. Impedance seen at node B for the first read element 102 and the first transmission line T1a is shown as Z1+Rmr/2, where Z1 is impedance of one of the resistances of the first read element 102 plus impedance of the corresponding transmission line T1a. Impedance seen at node B for the second read element 104 and transmission lines T1b-T2b is shown as Z2+Rmr/2, where Z2 is impedance of one of the resistances of the second read element 104 plus impedance of the corresponding transmission line T2b. Impedance Z1 may be equal to (Rmr/2)+50. Impedance Z2 may be equal to (Rmr+50)//50//50, where the sum Rmr+50 may be the impedance of the one of the resistances of the second read element 104 in series with the transmission line T2b, and where the one of the resistances of the second read element 104 and the transmission line T2b are connected in parallel (//) with the transmission line T2a and in parallel with the transmission line T1b.

If the impedance Rmr>>50Ω, then impedance Z(A) seen at node A may be 50Ω, impedance Z(B) seen at node B may be 25Ω, the current I may be equal to Vs1/Rmr, voltage V(A) at node A may be equal to (50/Rmr)*Vs1, and voltage V(B) at node B may be equal to −(25/Rmr)*Vs1. As a result, a read signal provided by the first read element 102 is provided at an input of the second differential amplifier A2 with an amplitude of, for example, (25/Rmr)*Vs1. Since Rmr>>50Ω, (25/Rmr)*Vs1 is negligible.

Also, the first differential voltage Vo1 is equal to Vo1a−Vo1b and is also equal to V(A)−V(B). The resulting voltage of V(A)−V(B) may be equal to (75/Rmr)*Vs1. The differential voltage Vo2 may be equal to (25/Rmr)Vs1. As a result, the differential voltages Vo1 and Vo2 can be represented by equations 1-2.

$$Vo1=(75/Rmr)*Vs1+Vs1+(25/Rmr)*Vs2 \quad (1)$$

$$Vo1=(75/Rmr)*Vs2+Vs1+(25/Rmr)*Vs1 \quad (2)$$

Signals having read element voltage Vs1 and Vs2 can be extracted via the differential amplifiers 110 based on the differential voltages Vo1 and Vo2. The read element voltages Vs1 and Vs2 may be represented by equations 3-4.

$$Vs1=(3*Vo1-Vo2)*Rmr/200 \quad (3)$$

$$Vs2=(3*Vo2-Vo1)*Rmr/200 \quad (4)$$

Figure 6:
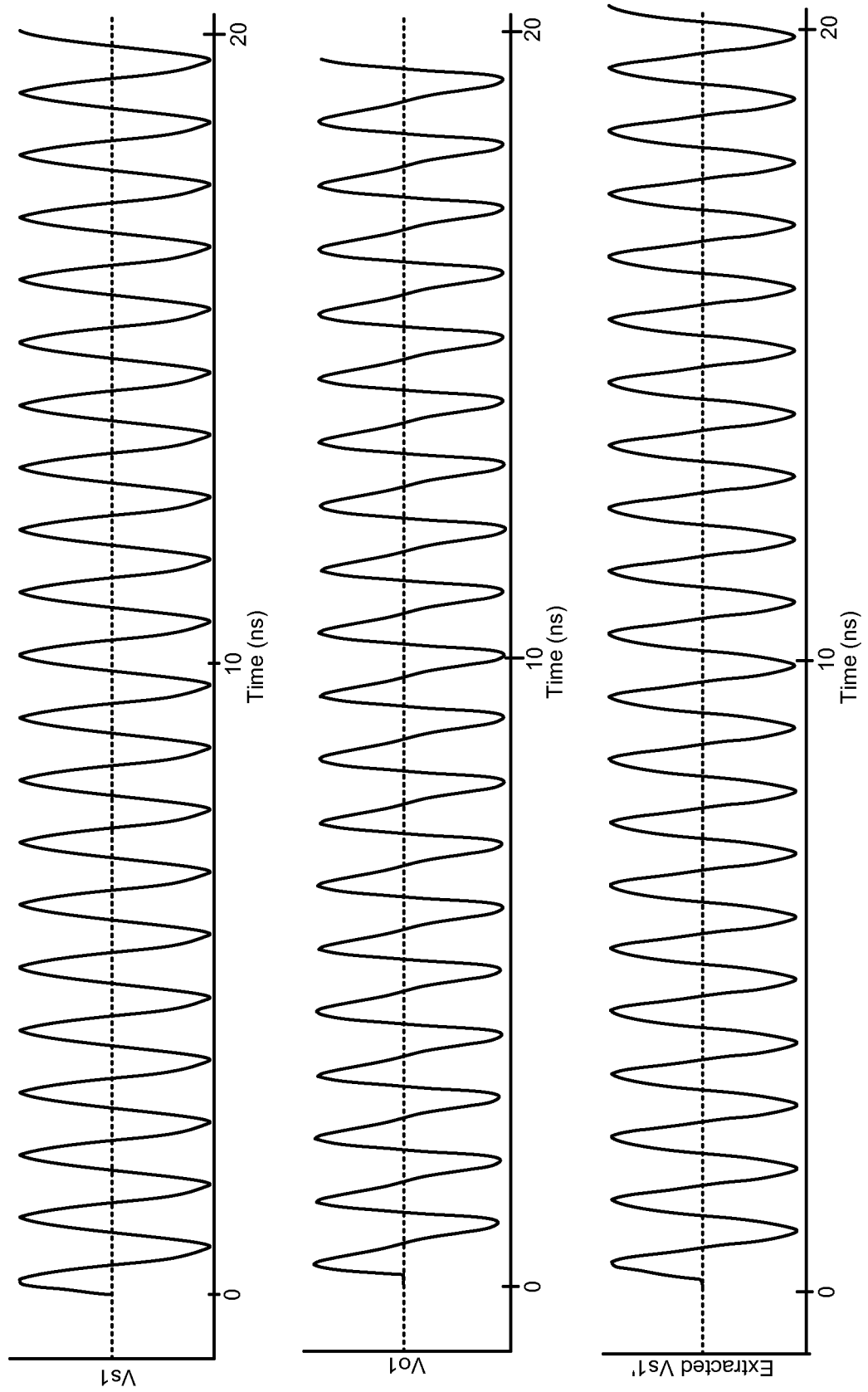
FIG. 6 includes voltage plots of a first read element voltage, a first differential voltage, and a first extracted voltage for the TDMR system of FIG. 5.

FIG. 6 shows voltage plots for the TDMR system 100 of FIG. 5. The voltage plots include: a plot of the first read element voltage Vs1 across the first read element 102; a plot of the first differential voltage Vo1 at the input terminals of the first differential amplifier A1; and a plot of a corresponding first extracted voltage Vs1'. The first extracted voltage Vs1' matches the first read element voltage Vs1. Thus, the amount of cross-coupling of signals with respect to the first differential amplifier A1, including cross-coupling of noise, is negligible and/or non-existent. In the example shown, impedance of each of the read elements 102, 104 is 500Ω, frequency of the first read element voltage Vs1 is 1 GHz, and frequency of the second read element voltage Vs2 is 2 GHz.

Figure 7:
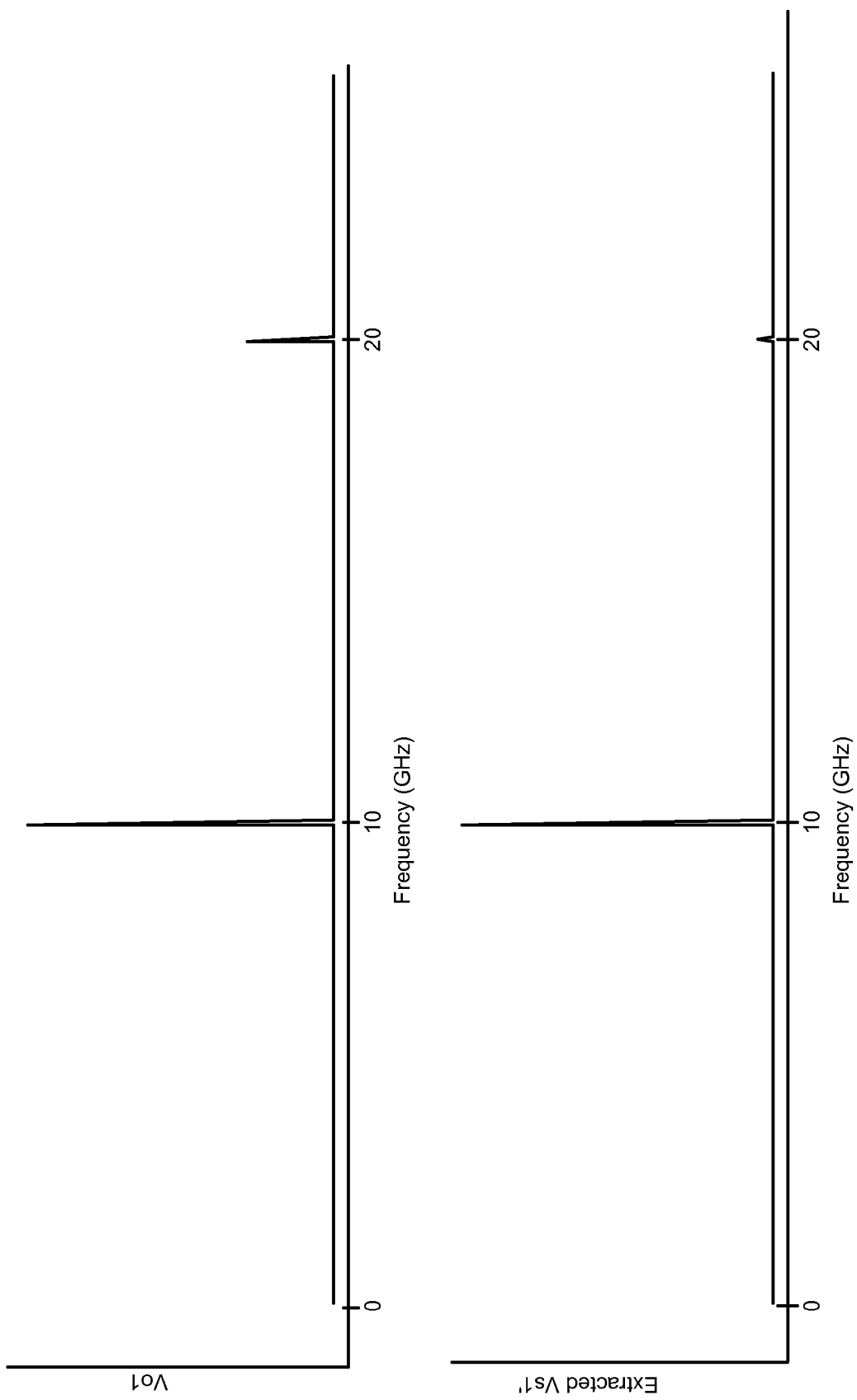
FIG. 7 includes frequency plots of the first differential voltage and the first extracted voltage of FIG. 6.

FIG. 7 shows frequency plots of the first differential voltage Vo1 and the first extracted voltage Vs1'. As can be seen in FIG. 7, the amplitude of the frequency component provided by the second read element voltage Vs2 is reduced from the frequency plot of the first differential voltage Vo1 to the plot of the first extracted voltage Vs1'. The first extracted voltage Vs1' may be detected internal to the first differential amplifier A1 and/or at an output terminal of the first differential amplifier A1.

Figure 8:
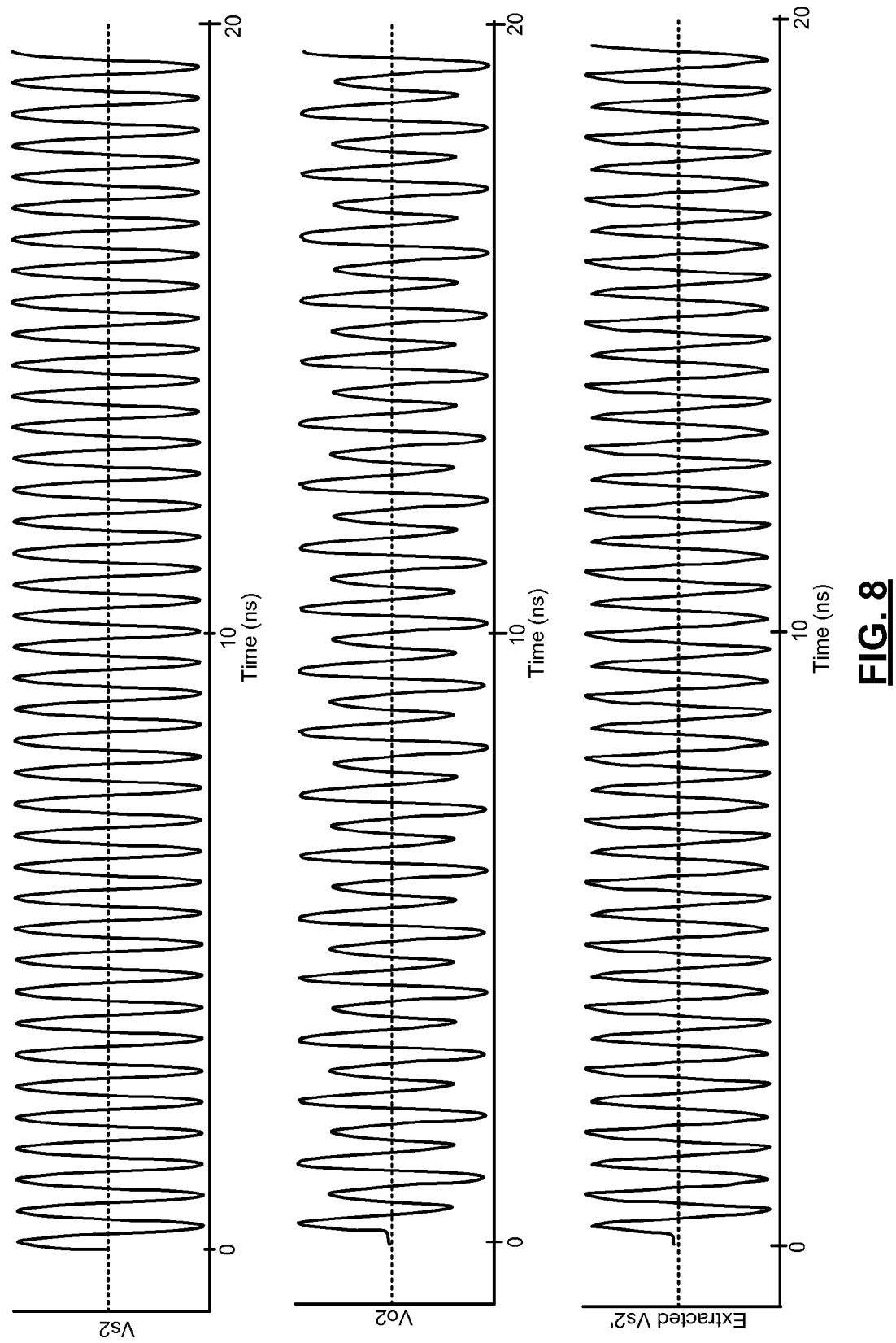
FIG. 8 includes voltage plots of a second read element voltage, a second differential voltage, and a second extracted voltage for the TDMR system of FIG. 5.

FIG. 8 shows additional voltage plots for the TDMR system 100 of FIG. 5. The voltage plots include: a plot of the second read element voltage Vs2 across the second read element 104; a plot of the second differential voltage Vo2 at the input terminals of the second differential amplifier A2; and a plot of a corresponding second extracted voltage Vs2'. The second extracted voltage Vs2' matches the second read element voltage Vs2. Thus, the amount of cross-coupling of signals with respect to the second differential amplifier A2, including cross-coupling of noise, is negligible and/or non-existent.

Figure 9:
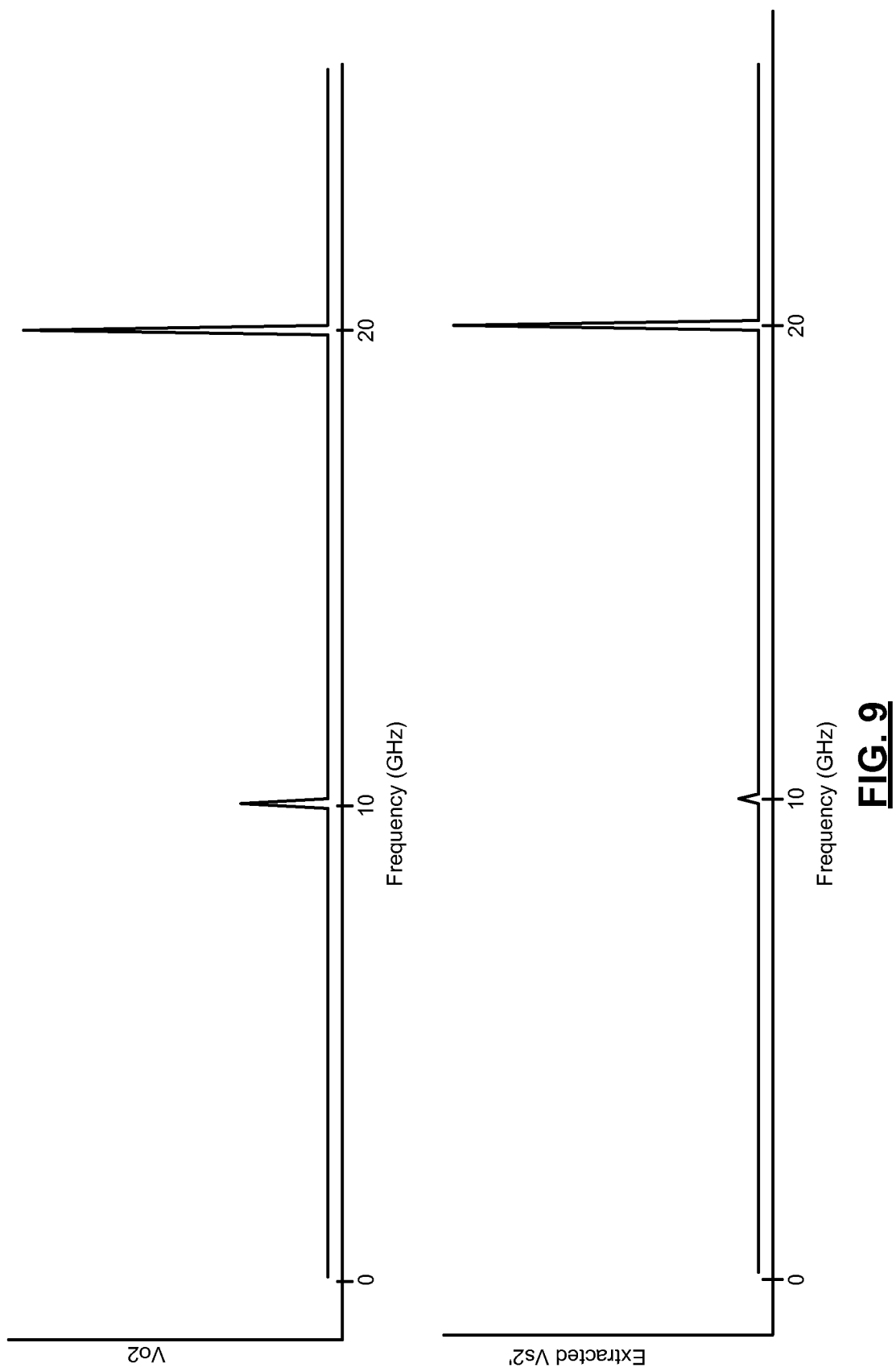
FIG. 9 includes frequency plots of the second differential voltage and the second extracted voltage of FIG. 8.

FIG. 9 shows frequency plots of the second differential voltage Vo2 and the first extracted voltage Vs2'. As can be seen in FIG. 9, the amplitude of the frequency component provided by the first read element voltage Vs1 is reduced from the frequency plot of the second differential voltage Vo2 to the plot of the second extracted voltage Vs2'. The second extracted voltage Vs2' may be detected internal to the second differential amplifier A2 and/or at an output terminal of the second differential amplifier A2.

Figure 10:
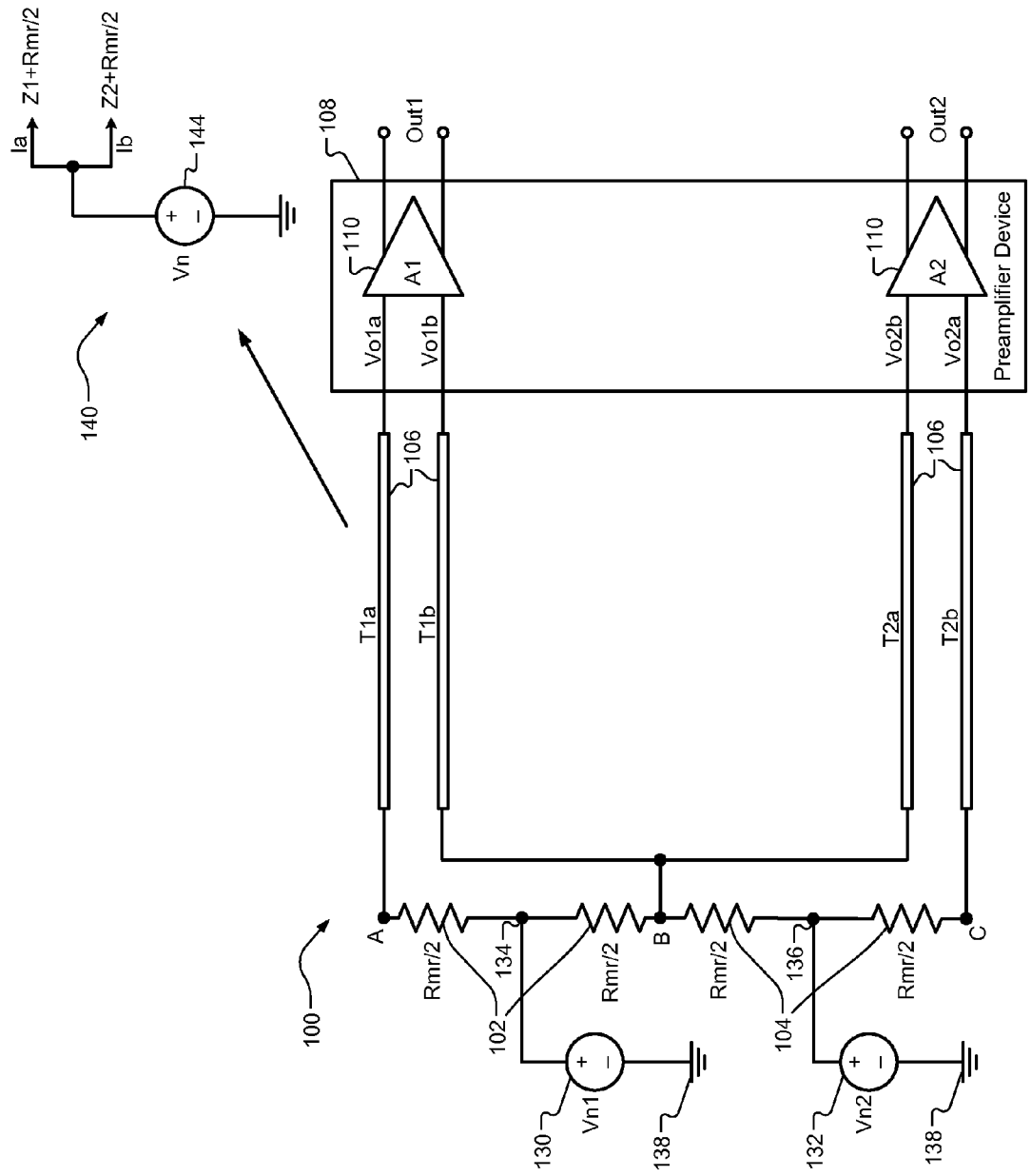
FIG. 10 is a functional block diagram illustrating common mode noise of the TDMR system of FIG. 5.

FIG. 10 illustrates common mode noise introduced in the TDMR system 100 of FIG. 5. As shown, the TDMR system 100 includes the resistances of the read elements 102, 104, the transmission lines 106, and the preamplifier device 108 with the differential amplifiers 110. The preamplifier device 108 may replace the preamplifier device 26 of FIG. 1. The read elements 102, 104 are connected in series and may be located in a head of a drive (e.g., in the head 20 of the hard drive 10 of FIG. 1). The voltage sources 112, 114 for the read element voltages Vs1, Vs2 are not shown in FIG. 10. The common mode noise is represented by noise sources 130, 132, which provide respective voltages Vn1, Vn2 at nodes 134, 136 between the resistances of the respective read elements 102, 104. The noise sources 130, 132 are connected between the nodes 134, 136 and a ground reference 138.

A corresponding equivalent impedance representation 140 for a noise source 142 having voltage Vn (representing the noise sources 130, 132) is shown and illustrates currents and impedances seen at node B. The current passing through node B towards node A is Ia. The current passing through node B and away from node A is Ib.

Impedance seen at node B for the first read element 102 and the first transmission line T1a is shown as Z1+Rmr/2, where Z1 is impedance of one of the resistances of the first read element 102 plus impedance of the corresponding transmission line T1a. Impedance seen at node B for the second read element 104 and transmission lines T1b-T2b is shown as Z2+Rmr/2, where Z2 is impedance of one of the resistances of the second read element 104 plus impedance of the corresponding transmission line T2b. Impedance Z1 may be equal to (Rmr/2)+50. Impedance Z2 may be equal to (Rmr+50)// 50//50, where the sum Rmr+50 is the impedance of the one of the resistances of the second read element 104 in series with the transmission line T2b, and where the one of the resistances of the second read element 104 and the transmission line T2b are connected in parallel (//) with the transmission line T2a and in parallel with the transmission line T1b.

If the impedance Rmr>>50Ω, then impedance Z(A) seen at node A may be 50Ω, impedance Z(B) seen at node B may be 25Ω, the current Ia may be equal to Vn/Rmr, and the current Ib may be equal to Vn/Rmr. Also, the voltage Vo1 is equal to Vo1a-Vo1b and may be equal to Ia*50-(Ib1/2)*50-(Ib2a)*50, where Ib1 is current passing through the second transmission line T1b, and where Ib2a is current passing through the third transmission line T2a. The differential voltage Vo1 may also be equal to ((Vn1)-(Vn2)/2-(Vn2)/2)*50/Rmr. If Vn1=Vn2 (i.e. there is the same common mode noise for read elements 102 and 104), then the differential voltage Vo1=0 as a result of the noise sources 130, 132. Thus, the common mode signal at node B due to noise does not affect the differential signals received at the differential amplifiers 110.

Figure 11:
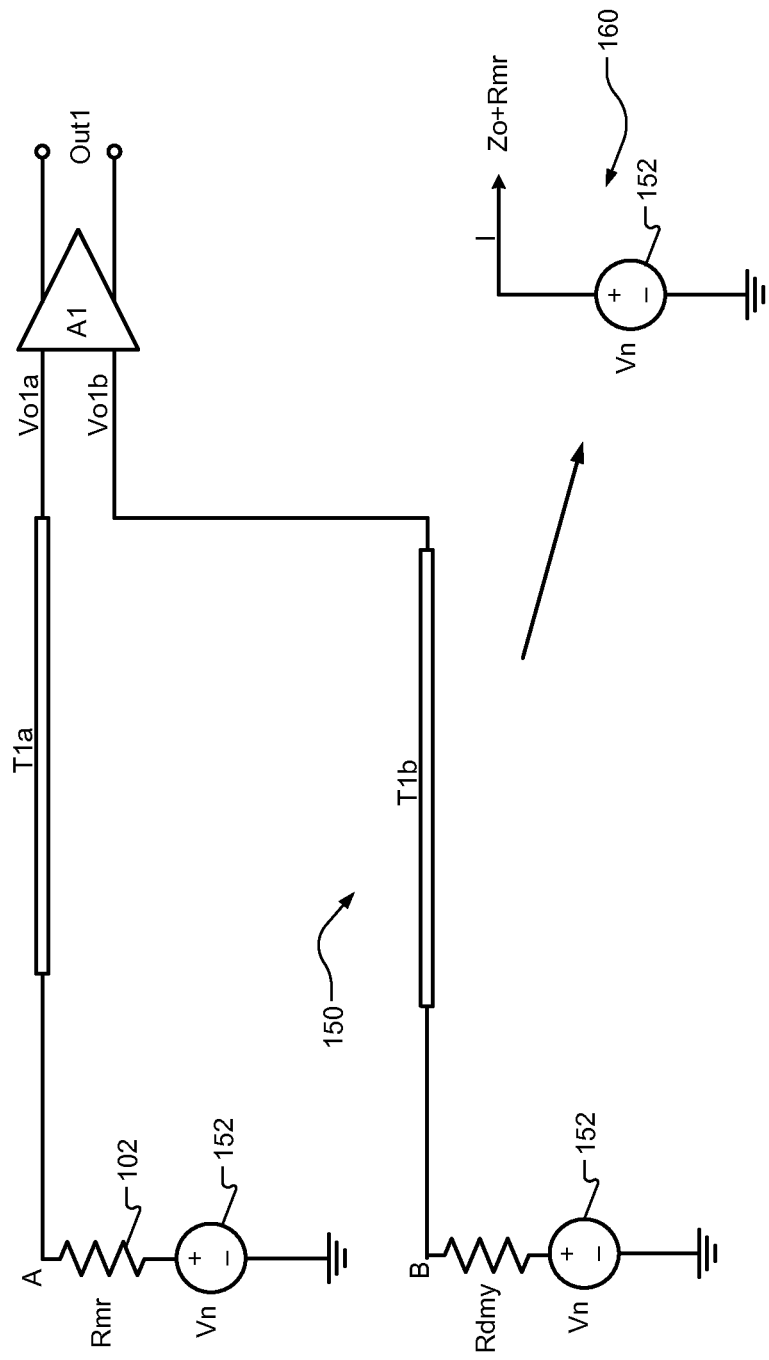
FIG. 11 is a functional block diagram illustrating a dummy path for common mode noise cancellation in the TDMR system of FIG. 5.

FIG. 11 shows a dummy path 150 for common mode noise cancellation in the TDMR system 100 of FIG. 5. The dummy path 150, may in general, represent noise provided to the second transmission line T1b from node B and the corresponding impedance Rdmy seen at node B. In FIG. 11 a noise source 152 for the first read element 102, the first transmission line T1a, and the first differential amplifier A1 are shown. The noise source 152 has a voltage Vn. The dummy path 150 has the resistance Rdmy at node B and includes the second transmission line T1b. The resistance Rdmy receives the voltage Vn from the noise source 152. Differential voltages Vo1a, Vo1b are provided to the input terminals of the differential amplifier A1. The resistance Rdmy may represent resistance seen at node B for the second read element 104 and the transmission lines T2a, T2b.

A corresponding equivalent impedance representation 160 for the noise source 152 is shown and includes (i) a current I passing from the noise source 152 through node A, and (ii) an impedance ($Z_0$+Rmr) seen at the noise source 152. The impedance $Z_0$ may be the impedance of the first transmission line T1a. If the impedance Rmr>>50Ω, then impedance Z(A) seen at node A may be Rmr+50Ω, impedance Z(B) seen at node B may be Rdmy+50Ω, the current Ia passing through node A may be Vn/Rmr, and the current Ib passing through node B may be equal to Vn/Rmr. Also, the differential voltage Vo1 is equal to Vo1a-Vo1b and may be equal to Ia*50-Ib*50. The differential voltage Vo1 may also be equal to [(1/Rmr)-(1/Rdmy)]*50*Vn. The common mode rejection ratio (CMRR) may be represented by equation 5.

$$\text{CMRR} = 20 \log [(1/Rmr)*50] - 20 \log \{[(1/Rmr)-(1/Rdmy)]*50\} \quad (5)$$

Based on equation 5, if Rdmy=a*Rmr and Rmr=500Ω, then the CMRR is equal to 20 log|α/(α-1)|, where α is a constant. As an example, to obtain a CMRR of 20 decibels (db), (10/11)<α<(10/9) or 0.91<α<1.1. If α is equal to or near 1.0, then Rdmy≅Rmr and Ia≅Ib. As a result, the difference between the voltages Vo1a and Vo1b is negligible.

Figure 12:
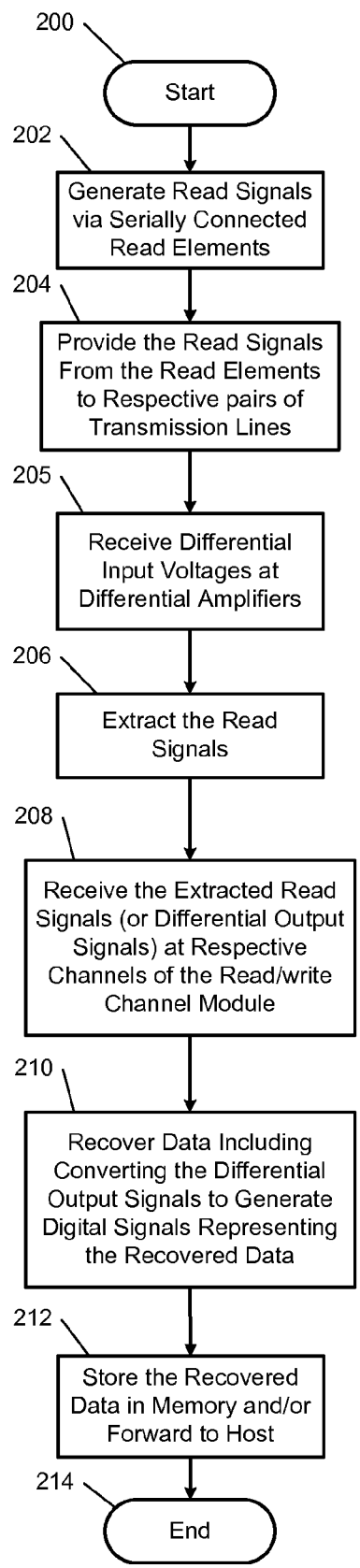
FIG. 12 illustrates a TDMR method in accordance with the present disclosure.

The systems disclosed herein may be operated using numerous methods, an example method is illustrated in FIG. 12. FIG. 12 illustrates a TDMR method in accordance with the present disclosure. Although the following tasks are primarily described with respect to the implementations of FIGS. 1 and 4-11, the tasks may be easily modified to apply to other implementations of the present disclosure. The tasks may be iteratively performed.

The TDMR method may begin at 200. At 202, read signals and corresponding voltages are generated via read elements (e.g., read elements 92, 102, 104). The read elements are connected in series. Each of the read elements has a corresponding pair of transmission lines (e.g., transmission lines 94, 106) and a respective differential amplifier (one of the differential amplifiers 98, 110).

At 204, the read signals are provided from the read elements to the respective pairs of transmission lines. At 205, differential input voltages are received at input terminals of the differential amplifiers via the transmission lines. At 206, the read signals and corresponding voltages are extracted as described above to generate differential output voltages. The differential input voltages are amplified via the differential amplifiers to generate the differential output voltages.

At 208, the differential output voltages are received at respective read/write channels of a read/write channel module (e.g., read/write channel module 28). At 210, the read/write channel module converts the differential output voltages, which are provided as analog signals, into digital signals. The digital signals are decoded to recover original data.

At 212, a HDC module (e.g., the HDC module 30) stores the data in memory (e.g., one of the memories 36, 38) and/or provides the data to a host via an interface (e.g., the interface 40). The method may end at 214.

The above-described tasks are meant to be illustrative examples; the tasks may be performed sequentially, synchronously, simultaneously, continuously, during overlapping time periods or in a different order depending upon the application. Also, any of the tasks may not be performed or skipped depending on the implementation and/or sequence of events.

Figure 13:
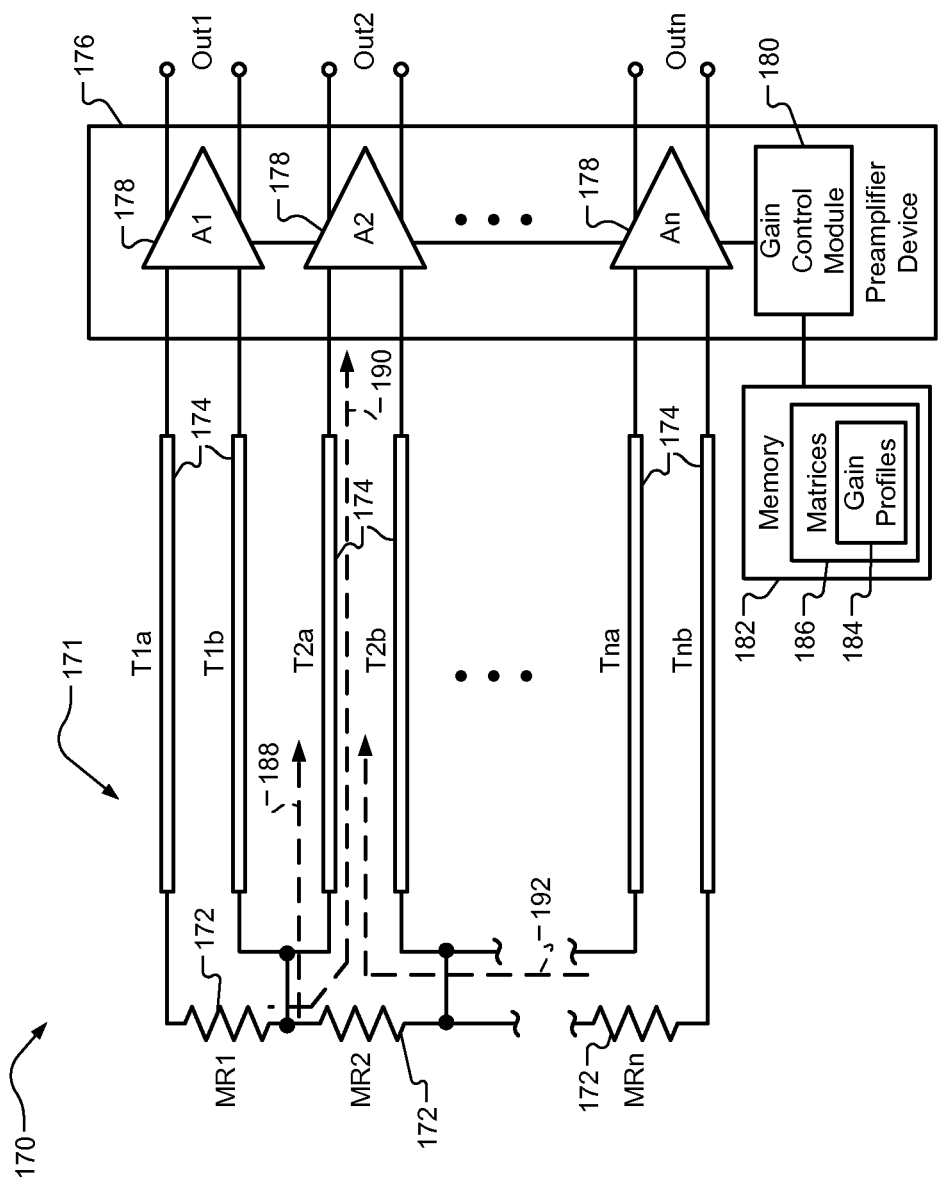
FIG. 13 is a functional block diagram of a TDMR system illustrating inter-modulation of signals from multiple read elements and a gain control module in accordance with the present disclosure.

FIG. 13 shows a TDMR system 170 that may be used in the hard drive 10 of FIG. 1. The TDMR system 170 includes: a read circuit 171 with read elements 172 and transmission lines 174; and a preamplifier device 176 with differential amplifiers 178. The TDMR system 170 is similar to the TDMR system 90 of FIG. 4. The TDMR system 170 includes a gain control module 180 and a memory 182. The gain control module 180 may be included: on the HDD PCB 14; in the processor 32; in the HDC module 30; in the read/write channel module 28; on the HDA 12; or in the preamplifier device 176, as shown. The preamplifier device 176 may replace the preamplifier device 26 of FIG. 1. The memory 182 may be included: on the HDD PCB 14; in the nonvolatile memory 38; in the volatile memory 36; in the HDC module 30; in the processor 32; in the read/write channel module 28; on the HDA 12; and/or in the preamplifier device 176.

The gain control module 180 estimates, adjusts and sets gain values of the differential amplifiers 178 to minimize crosstalk of signals from adjacent read elements picking up signals associated with adjacent tracks. The gain control module 180 performs a training method to obtain gain profiles 184 for each of the differential amplifiers 178 relative to respective ones of the read elements 172 and stores the gain profiles 184 in the memory 182. The gain profiles 184 may be included in matrices and/or tables 186 stored in the memory 182.

Since the read elements 172 are connected in series and since some of the transmission lines 174 are connected to more than one read element, read signals from each of the read elements 172 can be received and amplified by each of the differential amplifiers 178. Although this cross-coupling (also referred to as inter-modulation) of the read signals can be minimized as shown above, the cross-coupling can become more noticeable if the differential amplifiers 178 have different gains and the transmission lines 174 have different impedances. Each of the differential amplifiers 178 may amplify each of the read signals from each of the read elements 172 differently. The differential amplifiers 178 provide respectively the differential output signals Out1-n.

For example, the first differential amplifier A1 may amplify read signals as received from each of the read elements MR1-MRn based on gain of the first differential amplifier A1. The second differential amplifier A2 may amplify the read signals as received from each of the read elements MR1-MRn based on gain of the second differential amplifier A2. FIG. 13 illustrates an example of the read signals received by the second differential amplifier A2. The second differential amplifier A2 may receive: a read signal from the first read element MR1 (indicated by dashed line 188); a read signal from the second read element MR2 (indicated by dashed line 190); and one or more read signals from other read elements including the read element MRn (indicated by dashed line 192). Although the amplitude of the read signal from the second read element MR2 may be larger than the amplitudes of the read signals from other read elements, it can be difficult to differentiate the read signals received at the second differential amplifier A2.

Thus, it can be difficult to differentiate the read signals received at each of the differential amplifiers 187 if the cross-coupling of the read signals is not accounted for during the processing of the read signals. To account for the cross-coupling of the read signals and to differentiate the read signals corresponding to each of the differential amplifiers 178, the gain control module 180 performs a training and/or calibration method to obtain the gain profiles 184. The gain profiles 184 may be determined, for example, during manufacturing of the corresponding hard drive and stored in the memory 182. The gain profiles 184 may be used during operation of the hard drive and subsequent to manufacturing of the hard drive to recover data stored on a disk of the hard drive.

Figure 14:
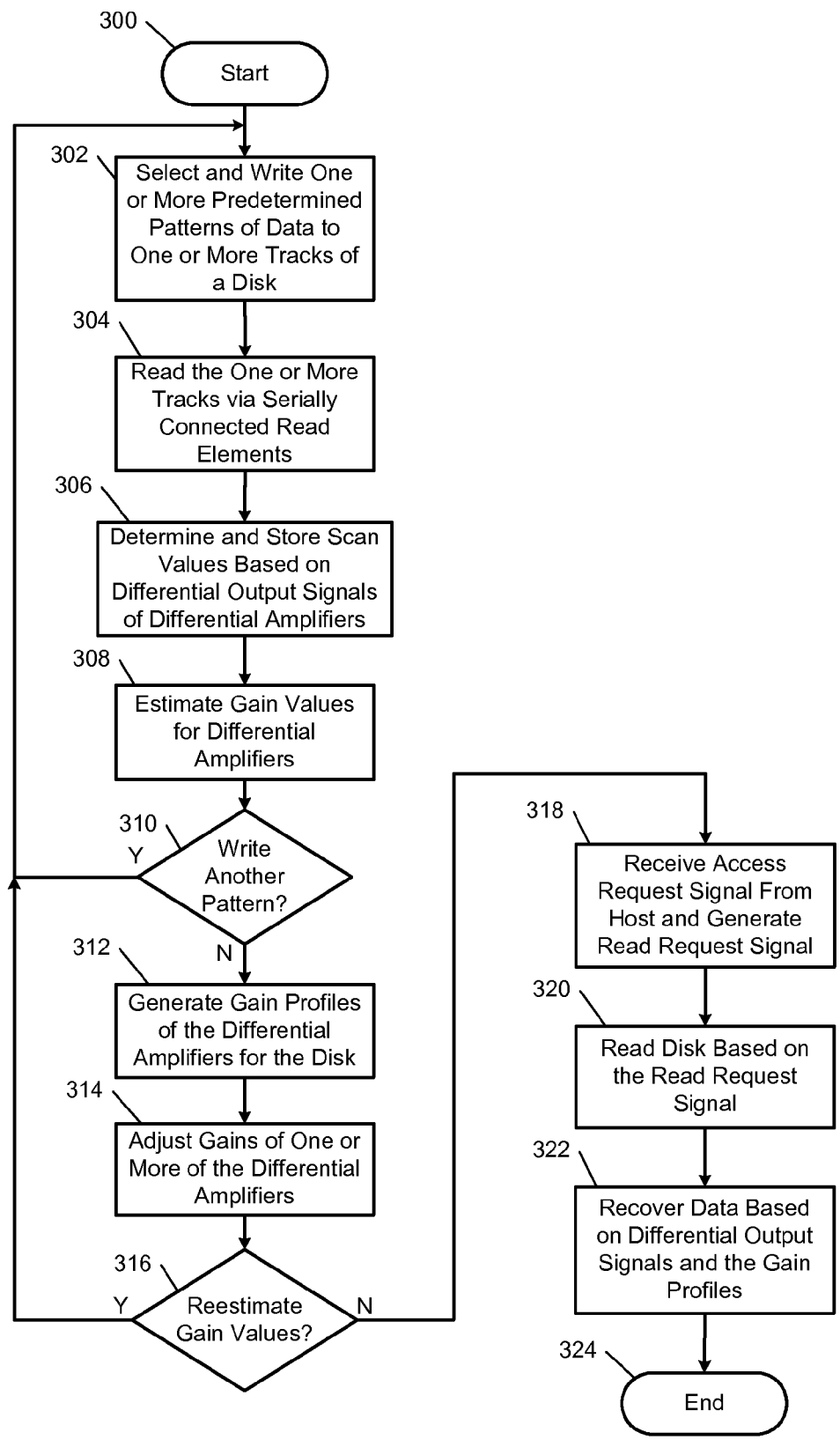
FIG. 14 illustrates a training, calibration and operating method of the TDMA system of FIG. 13.

FIG. 14 illustrates a training, calibration and operating method, which may be implemented by the TDMA system 170 and/or the hard drive 10 of FIG. 1. Although the following tasks are primarily described with respect to the implementations of FIGS. 1 and 13, the tasks may be easily modified to apply to other implementations of the present disclosure. The tasks may be iteratively performed. Although the following tasks are described primarily with respect to three read elements and three differential amplifiers, the tasks may be modified for any number of read elements and differential amplifiers.

The training, calibration and operating method may begin at 300. A training and/or calibration method is performed during tasks 302-316. The training and/or calibration method may be performed during servo formatting of a disk, during manufacturing of a disk (e.g., platter 16) and/or a disk drive (e.g., hard drive 10), and/or whenever gain calibration is to be performed. At 302, a gain control module (e.g., the gain control module 180) selects a predetermined pattern of data to write to one or more tracks of the disk and writes the predetermined pattern to the one or more tracks. The predetermined pattern may be written to predetermined zones of the disk.

The following tables 1-7 provide examples of patterns of data that may be written during task 302. The tables 1-7 include track numbers, a series of bit values to be written, and scan values for each scan performed. The scan values maybe output voltages indicated by the differential output signals. Also, for example purposes only, certain patterns of bit values are shown, any predetermined, pseudo-random, and/or random pattern of bit values may be written. Each of the bit values of table 1 are zero ('0'). Each of the bit values of table 2 are one ('1'). Table 3 is directed to writing zeros in each track, except for track N+4 in which ones are written. Table 4 is directed to writing zeroes in each track, except for tracks N+4 and N+5 in which ones are written. Table 5 is directed to writing zeroes in tracks N to N+3, ones in tracks N+4 to N+6, and zeroes in tracks N+7 to N+10. Table 6 is directed to alternating between writing zeroes and ones in every other track. Table 7 is directed to alternating between (i) writing zeroes in two tracks and (ii) writing ones in two tracks. Also, for example purposes only, scan values for three read elements MR1, MR2, and MR3 are shown. Scan values for a different number of read elements may be included in the tables. Also, any number of scans may be performed in association with each table and/or each predetermined pattern.

TABLE 1

| Track Number | Written Bit Values | Scan #1 | Scan #2 | Scan #3 | Scan #4 |
|---|---|---|---|---|---|
| N | 000 ... 0 | MR1 | | | |
| N + 1 | 000 ... 0 | MR2 | MR1 | | |
| N + 2 | 000 ... 0 | MR3 | MR2 | MR1 | |
| N + 3 | 000 ... 0 | | MR3 | MR2 | MR1 |
| N + 4 | 000 ... 0 | | | MR3 | MR2 |
| N + 5 | 000 ... 0 | | | | MR3 |
| N + 6 | 000 ... 0 | | | | |
| N + 7 | 000 ... 0 | | | | |

TABLE 2

| Track Number | Written Bit Values | Scan #1 | Scan #2 | Scan #3 | Scan #4 |
|---|---|---|---|---|---|
| N | 111 ... 1 | MR1 | | | |
| N + 1 | 111 ... 1 | MR2 | MR1 | | |
| N + 2 | 111 ... 1 | MR3 | MR2 | MR1 | |
| N + 3 | 111 ... 1 | | MR3 | MR2 | MR1 |
| N + 4 | 111 ... 1 | | | MR3 | MR2 |
| N + 5 | 111 ... 1 | | | | MR3 |
| N + 6 | 111 ... 1 | | | | |
| N + 7 | 111 ... 1 | | | | |

TABLE 3

| Track Number | Written Bit Values | Scan #1 | Scan #2 | Scan #3 | Scan #4 | Scan #5 | Scan #6 | Scan #7 |
|---|---|---|---|---|---|---|---|---|
| N | 000 ... 0 | MR1 | | | | | | |
| N + 1 | 000 ... 0 | MR2 | MR1 | | | | | |
| N + 2 | 000 ... 0 | MR3 | MR2 | MR1 | | | | |
| N + 3 | 000 ... 0 | | MR3 | MR2 | MR1 | | | |

TABLE 3-continued

| Track Number | Written Bit Values | Scan #1 | Scan #2 | Scan #3 | Scan #4 | Scan #5 | Scan #6 | Scan #7 |
|---|---|---|---|---|---|---|---|---|
| N + 4  | 111 . . . 1 |  |  | MR3 | MR2 | MR1 |  |  |
| N + 5  | 000 . . . 0 |  |  |  | MR3 | MR2 | MR1 |  |
| N + 6  | 000 . . . 0 |  |  |  |  | MR3 | MR2 | MR1 |
| N + 7  | 000 . . . 0 |  |  |  |  |  | MR3 | MR2 |
| N + 8  | 000 . . . 0 |  |  |  |  |  |  | MR3 |
| N + 9  | 000 . . . 0 |  |  |  |  |  |  |  |
| N + 10 | 000 . . . 0 |  |  |  |  |  |  |  |

TABLE 4

| Track Number | Written Bit Values | Scan #1 | Scan #2 | Scan #3 | Scan #4 | Scan #5 | Scan #6 | Scan #7 |
|---|---|---|---|---|---|---|---|---|
| N      | 000 . . . 0 | MR1 |  |  |  |  |  |  |
| N + 1  | 000 . . . 0 | MR2 | MR1 |  |  |  |  |  |
| N + 2  | 000 . . . 0 | MR3 | MR2 | MR1 |  |  |  |  |
| N + 3  | 000 . . . 0 |  | MR3 | MR2 | MR1 |  |  |  |
| N + 4  | 111 . . . 1 |  |  | MR3 | MR2 | MR1 |  |  |
| N + 5  | 111 . . . 1 |  |  |  | MR3 | MR2 | MR1 |  |
| N + 6  | 000 . . . 0 |  |  |  |  | MR3 | MR2 | MR1 |
| N + 7  | 000 . . . 0 |  |  |  |  |  | MR3 | MR2 |
| N + 8  | 000 . . . 0 |  |  |  |  |  |  | MR3 |
| N + 9  | 000 . . . 0 |  |  |  |  |  |  |  |
| N + 10 | 000 . . . 0 |  |  |  |  |  |  |  |

TABLE 5

| Track Number | Written Bit Values | Scan #1 | Scan #2 | Scan #3 | Scan #4 | Scan #5 | Scan #6 | Scan #7 | Scan #8 |
|---|---|---|---|---|---|---|---|---|---|
| N      | 000 . . . 0 | MR1 |  |  |  |  |  |  |  |
| N + 1  | 000 . . . 0 | MR2 | MR1 |  |  |  |  |  |  |
| N + 2  | 000 . . . 0 | MR3 | MR2 | MR1 |  |  |  |  |  |
| N + 3  | 000 . . . 0 |  | MR3 | MR2 | MR1 |  |  |  |  |
| N + 4  | 111 . . . 1 |  |  | MR3 | MR2 | MR1 |  |  |  |
| N + 5  | 111 . . . 1 |  |  |  | MR3 | MR2 | MR1 |  |  |
| N + 6  | 111 . . . 1 |  |  |  |  | MR3 | MR2 | MR1 | MR1 |
| N + 7  | 000 . . . 0 |  |  |  |  |  | MR3 | MR2 | MR2 |
| N + 8  | 000 . . . 0 |  |  |  |  |  |  | MR3 | MR3 |
| N + 9  | 000 . . . 0 |  |  |  |  |  |  |  |  |
| N + 10 | 000 . . . 0 |  |  |  |  |  |  |  |  |

TABLE 6

| Track Number | Written Bit Values | Scan #1 | Scan #2 | Scan #3 | Scan #4 | Scan #5 | Scan #6 | Scan #7 | Scan #8 |
|---|---|---|---|---|---|---|---|---|---|
| N      | 000 . . . 0 | MR1 |  |  |  |  |  |  |  |
| N + 1  | 111 . . . 1 | MR2 | MR1 |  |  |  |  |  |  |
| N + 2  | 000 . . . 0 | MR3 | MR2 | MR1 |  |  |  |  |  |
| N + 3  | 111 . . . 1 |  | MR3 | MR2 | MR1 |  |  |  |  |
| N + 4  | 000 . . . 0 |  |  | MR3 | MR2 | MR1 |  |  |  |
| N + 5  | 111 . . . 1 |  |  |  | MR3 | MR2 | MR1 |  |  |
| N + 6  | 000 . . . 0 |  |  |  |  | MR3 | MR2 | MR1 |  |
| N + 7  | 111 . . . 1 |  |  |  |  |  | MR3 | MR2 | MR1 |
| N + 8  | 000 . . . 0 |  |  |  |  |  |  | MR3 | MR2 |
| N + 9  | 111 . . . 1 |  |  |  |  |  |  |  | MR3 |
| N + 10 | 000 . . . 0 |  |  |  |  |  |  |  |  |

TABLE 7

| Track Number | Written Bit Values | Scan #1 | Scan #2 | Scan #3 | Scan #4 | Scan #5 | Scan #6 | Scan #7 | Scan #8 |
|---|---|---|---|---|---|---|---|---|---|
| N     | 000 . . . 0 | MR1 |  |  |  |  |  |  |  |
| N + 1 | 000 . . . 0 | MR2 | MR1 |  |  |  |  |  |  |
| N + 2 | 111 . . . 1 | MR3 | MR2 | MR1 |  |  |  |  |  |
| N + 3 | 111 . . . 1 |  | MR3 | MR2 | MR1 |  |  |  |  |

TABLE 7-continued

| Track Number | Written Bit Values | Scan #1 | Scan #2 | Scan #3 | Scan #4 | Scan #5 | Scan #6 | Scan #7 | Scan #8 |
|---|---|---|---|---|---|---|---|---|---|
| N + 4 | 000 . . . 0 | | | MR3 | MR2 | MR1 | | | |
| N + 5 | 000 . . . 0 | | | | MR3 | MR2 | MR1 | | |
| N + 6 | 111 . . . 1 | | | | | MR3 | MR2 | MR1 | |
| N + 7 | 111 . . . 1 | | | | | | MR3 | MR2 | MR1 |
| N + 8 | 000 . . . 0 | | | | | | | MR3 | MR2 |
| N + 9 | 000 . . . 0 | | | | | | | | MR3 |
| N + 10 | 111 . . . 1 | | | | | | | | |

As an alternative and/or in addition to writing one or more of the patterns provided by tables 1-7 and/or other patterns, examples of different sequences of bit values are shown below. The sequences may be written during iterations of task 302. Although sequences are provided for two-four tracks, sequences may be provided for any number of tracks and the patterns of the sequences may be repeated for additional tracks. The sequences include a match sequence, a first alternate sequence, a second alternate sequence, a first pseudo-random sequence, and a second pseudo-random sequence. The match sequence includes writing the same sequence of bit values to each of the three tracks. The first alternate sequence includes writing the same sequence to the first and third tracks and writing an opposite sequence to the second track. The second alternate sequence includes writing the same sequence to the first and second tracks, while writing the opposite sequence to the third and fourth tracks. The first pseudo-random sequence includes alternating between zero and one for the first track and alternating between two zeros and two ones for the second track. The second pseudo-random sequence includes alternating between a first predetermined number of zeros (e.g., four zeros) and a one for the first track and a first predetermined number of zeros (e.g., two zeros) and a one for the second track. Opposite values (e.g., ones instead of zeroes and zeroes instead of ones) may be written for each of the example sequences.

Match Sequence

Track 1—01010101010101010 . . . 01010101010
Track 2—01010101010101010 . . . 01010101010
Track 3—01010101010101010 . . . 01010101010

Alternate Sequence 1

Track 1—01010101010101010 . . . 01010101010
Track 2—10101010101010101 . . . 10101010101
Track 3—01010101010101010 . . . 01010101010

Alternate Sequence 2

Track 1—01010101010101010 . . . 01010101010
Track 2—01010101010101010 . . . 01010101010
Track 3—10101010101010101 . . . 10101010101
Track 4—10101010101010101 . . . 10101010101

Pseudo-Random Sequence 1

Track 1—0101010101010101 . . . 0101010101
Track 2—0011001100110011 . . . 0011001100

Pseudo-Random Sequence 2

Track 1—000010000100001 . . . 000010000100001
Track 2—001001001001001 . . . 001001001001001

At 304, the gain control module reads the one or more tracks via the read elements MR1, MR2, MR3. Read signals are generated by the read elements MR1, MR2, MR3 and amplified by differential amplifiers (e.g., the differential amplifiers 178) to generate differential output signals. At 306, the gain control module determines and stores scan values based on corresponding differential output signals (e.g., the output signals Out1-$n$) of the differential amplifiers. The scan values maybe output voltages indicated by the differential output signals.

At 308, the gain control module may estimate gain component values for each of the differential amplifiers based on the scan values read at 306. As an example, the gain component values may be determined using the following equations 6-8, where $V_1$, $V_2$, $V_3$ are output voltages of the differential amplifiers, $i_1$, $i_2$, $i_3$ are currents from each of the read elements, and $k_{11}$-$k_{33}$ are gain component values associated with each of the differential amplifiers for each of the read signals.

$$V_1 = k_{11}i_1 + k_{12}i_2 + k_{13}i_3 \tag{6}$$

$$V_2 = k_{21}i_1 + k_{22}i_2 + k_{23}i_3 \tag{7}$$

$$V_3 = k_{31}i_1 + k_{32}i_2 + k_{33}i_3 \tag{8}$$

The voltages $V_1$, $V_2$, $V_3$ can be detected. The currents $i_1$, $i_2$, $i_3$ can be detected and/or estimated based on the known patterns of bit values written to the tracks. The gain component values $k_{11}$-$k_{33}$ may be estimated based on the voltages $V_1$, $V_2$, $V_3$, the currents $i_1$, $i_2$, $i_3$ and the known patterns of bit values written to the tracks. The gain component values $k_{11}$-$k_{33}$ may be stored in a memory (e.g., the memory 182). Different estimates of each of the gain component values $k_{11}$-$k_{33}$ may be determined for each track and/or location on the track.

At 310, the gain control module determines whether to write another predetermined pattern. If another predetermined pattern is to be written, task 302 is performed, otherwise task 312 is performed. Tasks 302-310 may be repeated for each pattern of data written to the one or more tracks.

At 312, post processing of the gain component values may be performed to provide the gain profiles of each of the differential amplifiers for each surface of the disk and/or surfaces of one or more other disks. Each of the gain profiles may include gain component values for each of the read elements and corresponding read signals. Each of the gain profiles may include gain component values for each track and/or location on each disk. The gain profiles indicate how each of the read signals is being amplified by each of the differential amplifiers.

At 314, the gain control module may adjust gains of each of the differential amplifiers to minimize components from adjacent read elements and thus the effects of crosstalk. For example, the gain control module may adjust a gain of each of the differential amplifiers to change the estimated gain component values $k_{11}$-$k_{33}$ in task 308. The gain control module may adjust the gains based on predetermined values for the gain component values $k_{11}$-$k_{33}$ to minimize the components from adjacent read elements. The gains of the differential amplifiers may be adjusted based on a comparison between the predetermined values for the gain component values $k_{11}$-$k_{33}$ and the estimated gain component values for $k_{11}$-$k_{33}$.

At 316, the gain control module determines whether to reestimate the gain component values $k_{11}$-$k_{33}$. If the gain component values $k_{11}$-$k_{33}$ are to be reestimated, then task 302 is performed, otherwise task 318 is performed. The training and/or calibration method ends and the operating method begins when the gain control module has completed adjustment of the gains of the differential amplifiers and as a result has completed adjustment of the gain component values $k_{11}$-$k_{33}$.

At 318, a HDC module (e.g., the HDC module 30) may receive access request signals from a host via an interface (e.g., the interface 40) and generate read request signals. At 320, a read/write channel module (e.g., the read/write channel module 28) may read from the disk based on the read request signals. Read signals are generated via the read elements. The differential amplifiers generate differential output signals based on the read signals. At 322, the read/write channel module recovers data previously written on the disk based on the gain profiles determined during the training and/or calibration method. The operating method may end at 324 or may return to task 318 if an additional data access request is to be processed.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium include nonvolatile memory (such as flash memory), volatile memory (such as static random access memory and dynamic random access memory), magnetic storage (such as magnetic tape or hard disk drive), and optical storage.

The apparatuses and methods described in this application may be partially or fully implemented by one or more computer programs executed by one or more processors. The computer programs include processor-executable instructions that are stored on at least one non-transitory, tangible computer-readable medium. The computer programs may also include and/or rely on stored data.

What is claimed is:

1. A system comprising:
a plurality of transmission lines;
a plurality of read elements connected in series, wherein each of the plurality of read elements is connected to a respective pair of the plurality of transmission lines; and
a plurality of differential amplifiers connected respectively to the plurality of read elements via the plurality of transmission lines, wherein the plurality of differential amplifiers are configured to amplify differential signals received from the respective pairs of the plurality of transmission lines,
wherein
the plurality of transmission lines comprises a first transmission line, a second transmission line, and a third transmission line,
the plurality of read elements comprise a first element and a second element,
the plurality of differential amplifiers comprise a first differential amplifier and a second differential amplifier,
the first element is connected to the first transmission line,
the second element is connected to the second transmission line and the third transmission line,
the first transmission line is connected to a first input terminal of the first differential amplifier,
the second transmission line is connected to a second input terminal of the first differential amplifier, and
the third transmission line is connected to a first input terminal of the second differential amplifier.

2. The system of claim 1, wherein a number of the plurality of transmission lines is twice a number of the plurality of read elements.

3. The system of claim 1, wherein a number of the plurality of read elements is equal to a number of the plurality of differential amplifiers.

4. The system of claim 1, wherein a number of the plurality of transmission lines is twice a number of the plurality of differential amplifiers.

5. The system of claim 1, wherein:
the plurality of transmission lines comprise a fourth transmission line;
the second element is connected to the fourth transmission line; and
the fourth transmission line is connected to a second input terminal of the second differential amplifier.

6. The system of claim 1, further comprising a module configured to receive output signals on respective channels from the plurality of differential amplifiers and recover data based on output signals, wherein the plurality of differential amplifiers are configured to amplify the differential signals to generate the output signals.

7. A system comprising:
a plurality of transmission lines;
a plurality of read elements connected in series, wherein each of the plurality of read elements is connected to a respective pair of the plurality of transmission lines;
a plurality of differential amplifiers connected respectively to the plurality of read elements via the plurality of transmission lines, wherein the plurality of differential amplifiers are configured to amplify differential signals received from the respective pairs of the plurality of transmission lines;
a device comprising the plurality of differential amplifiers;
a plurality of heads disposed on a same surface of a disk, wherein each of the plurality of heads comprises a respective one of the plurality of read elements; and
an assembly comprising the plurality of transmission lines, wherein the assembly suspends the plurality of transmission lines over a portion of the disk between the device and the plurality of heads.

8. A system comprising:
a plurality of transmission lines;
a plurality of read elements connected in series, wherein each of the plurality of read elements is connected to a respective pair of the plurality of transmission lines;
a plurality of differential amplifiers connected respectively to the plurality of read elements via the plurality of transmission lines, wherein the plurality of differential amplifiers are configured to amplify differential signals received from the respective pairs of the plurality of transmission lines; and
a module configured to, during a training process or a calibration process
write a predetermined pattern of data to one or more tracks of a disk,
read the one or more tracks via the plurality of read elements,
based on the reading of the one or more tracks, determine scan values based on outputs of the plurality of differential amplifiers,
based on the predetermined pattern of data, estimate gain component values of each of the plurality of differential amplifiers attributable to each of the plurality of read elements, and
based on the estimated gain component values, generate gain profiles of each of the plurality of differential amplifiers.

9. The system of claim 8, wherein the module is configured to adjust the gains of the plurality of differential amplifiers based on the estimated gain component values.

10. The system of claim 9, wherein the module is configured to reestimate the gain component values subsequent to the adjustment of the gains of the differential amplifiers.

11. The system of claim 8, further comprising a second module configured to, subsequent to performing the training process or the calibration process, recover data previously written on the disk based on the gain profiles.

12. A method comprising:
performing a read operation via a plurality of read elements, wherein the plurality of read elements are connected in series, and wherein each of the plurality of read elements is connected to a respective pair of a plurality of transmission lines;
providing outputs of the plurality of read elements to a plurality of differential amplifiers via the plurality of transmission lines, wherein the plurality of differential amplifiers are connected respectively to the plurality of read elements via the plurality of transmission lines; and
amplifying, via the plurality of differential amplifiers, differential signals received from the respective pairs of the plurality of transmission lines,
wherein
a device comprises the plurality of differential amplifiers;
the plurality of read elements are arranged in respective heads;
the heads are disposed on a same surface of a disk; and
the plurality of transmission lines are suspended over a portion of the disk between the device and the heads.

13. The method of claim 12, wherein:
a number of the plurality of transmission lines is twice a number of the plurality of read elements;
the number of the plurality of read elements is equal to a number of the plurality of differential amplifiers; and
the number of the number of the plurality of transmission lines is twice the number of the plurality of differential amplifiers.

14. The method of claim 12, further comprising:
amplifying, via the plurality of differential amplifiers, the differential signals to generate output signals;
receiving output signals on respective channels from the plurality of differential amplifiers; and
recovering data based on output signals.

15. A method comprising:
performing a read operation via a plurality of read elements, wherein the plurality of read elements are connected in series, and wherein each of the plurality of read elements is connected to a respective pair of a plurality of transmission lines;
providing outputs of the plurality of read elements to a plurality of differential amplifiers via the plurality of transmission lines, wherein the plurality of differential amplifiers are connected respectively to the plurality of read elements via the plurality of transmission lines;
amplifying, via the plurality of differential amplifiers, differential signals received from the respective pairs of the plurality of transmission lines; and
during a training process or a calibration process,
writing a predetermined pattern of data to one or more tracks of a disk,
reading the one or more tracks via the plurality of read elements,
based on the reading of the one or more tracks, determining scan values based on outputs of the plurality of differential amplifiers,
based on the predetermined pattern of data, estimating gain component values of each of the plurality of differential amplifiers attributable to each of the plurality of read elements, and
based on the estimated gain component values, generating gain profiles of each of the plurality of differential amplifiers.

16. The method of claim 15, further comprising adjusting the gains of the plurality of differential amplifiers based on the estimated gain component values.

17. The method of claim 16, further comprising reestimating the gain component values subsequent to the adjustment of the gains of the differential amplifiers.

18. The method of claim 15, further comprising, subsequent to the training process or the calibration process, recovering data written on the disk based on the gain profiles.

* * * * *